US008204026B2

(12) United States Patent
Gandham et al.

(10) Patent No.: US 8,204,026 B2
(45) Date of Patent: Jun. 19, 2012

(54) ELEMENT-BASED METHOD FOR AUTO-CONFIGURATION OF HANDSETS BY A BASE STATION IN A HETEROGENEOUS MAC PROTOCOL FOR WIRELESS NETWORKS

(75) Inventors: Shashidhar R. Gandham, Sunrise, FL (US); Amit Shukla, Sunrise, FL (US)

(73) Assignee: XG Technology, Inc., Sarasota, FL (US)

( * ) Notice: Subject to any disclaimer, the term of this patent is extended or adjusted under 35 U.S.C. 154(b) by 471 days.

(21) Appl. No.: 12/456,758

(22) Filed: Jun. 22, 2009

(65) Prior Publication Data

US 2009/0316670 A1    Dec. 24, 2009

Related U.S. Application Data

(60) Provisional application No. 61/132,839, filed on Jun. 23, 2008.

(51) Int. Cl.
*H04W 4/00* (2009.01)
*H04B 7/212* (2006.01)
*H04J 3/16* (2006.01)

(52) U.S. Cl. ......... 370/337; 370/338; 370/347; 370/468

(58) Field of Classification Search .................. 370/338, 370/352, 468
See application file for complete search history.

(56) References Cited

U.S. PATENT DOCUMENTS

| 6,519,469 | B1 | 2/2003 | Rydnell et al. | |
|---|---|---|---|---|
| 6,587,453 | B1 * | 7/2003 | Romans et al. | 370/347 |
| 8,130,731 | B2 * | 3/2012 | Hollick et al. | 370/337 |
| 2001/0008533 | A1 * | 7/2001 | Umayabashi | 370/468 |
| 2005/0094618 | A1 | 5/2005 | Colban et al. | |
| 2005/0141452 | A1 | 6/2005 | Vancraeynest | |
| 2006/0023684 | A1 | 2/2006 | Seo et al. | |
| 2007/0019664 | A1 | 1/2007 | Benveniste | |
| 2007/0050773 | A1 * | 3/2007 | Tayyar et al. | 718/102 |
| 2007/0286075 | A1 * | 12/2007 | Shoham et al. | 370/230 |
| 2008/0159240 | A1 * | 7/2008 | Hamilton | 370/338 |
| 2009/0028108 | A1 * | 1/2009 | Sherman | 370/329 |

* cited by examiner

Primary Examiner — Brandon Renner
(74) Attorney, Agent, or Firm — Dennis L. Cook, Esq.

(57) ABSTRACT

An element-based method to automatically configure mobile handsets by the base station using a protocol that combines contention-free and contention-based MAC protocols for use in wireless VoIP systems with multiple base stations is disclosed.

1 Claim, 2 Drawing Sheets

ELEMENT-BASED METHOD FOR AUTO-CONFIGURATION OF HANDSETS BY A BASE STATION IN A HETEROGENEOUS MAC PROTOCOL FOR WIRELESS NETWORKS

CROSS-REFERENCE TO RELATED APPLICATION

The present application claims the benefit of previously filed co-pending Provisional Patent Application Ser. No. 61/132,839.

FIELD OF THE INVENTION

This invention addresses the need to transport high bit-rate data and voice to multiple users over wired and wireless means. Specifically, this disclosure describes an element-based method to automatically configure mobile handsets by the base station using a protocol that combines contention-free and contention-based MAC protocols for use in wireless VoIP systems with multiple base stations.

BACKGROUND OF THE INVENTION

The invention disclosed in this application uses any integer cycle or impulse type modulation and more particularly is designed to work with a method of modulation named Tri-State Integer Cycle Modulation (TICM) which has been previously disclosed in U.S. Pat. No. 7,003,047 issued Feb. 21, 2006 and is now known by its commercial designation, xMax. This new wireless physical layer technology developed by xG Technology Inc., referred to as xMAX, enables extremely low power omni-directional transmissions to be received in a wide area Using xMAX, significant bandwidth can be made available for supporting various wireless applications. Voice Over IP (VoIP) based cellular services are now being developed using xMAX. In xMAX-based cellular networks both the base station and the handsets will be equipped with an xMAX transceiver. A mobile device (xMAX handset) in such a network will be free to move in an area covered by multiple xMAX base stations. Although the Heterogeneous MAC protocol for multiple base stations is disclosed in the preferred embodiment as being used in these types of integer cycle and pulse modulation systems it can be implemented on any broad band wireless technologies like WiMax, WiBro, WiFi, 3GPP and HSDPA, or any other type of wired or wireless voice or data systems.

A heterogeneous MAC protocol proposed to support VOIP traffic in xMAX wireless networks has been discussed in previously filed patent applications U.S. Ser. Nos. 12/069, 057; 12/070,815; 12/380,698; 12/384,546; 61/125,696; 61/132,160; and, 61/132,131 which are incorporated by reference into this disclosure. In the heterogeneous MAC protocol described in these applications, guaranteed timeslots are assigned to forward VOIP packets, temporary timeslots are assigned to forward data packets and contention based access is used to exchange control messages. This application describes an element-based method to automatically configure mobile handsets by the base station using a protocol that combines contention-free and contention-based MAC protocols for use in wireless VoIP systems with multiple base stations.

BRIEF SUMMARY OF THE INVENTION

The invention disclosed in this application was developed for and is described in the preferred embodiment as being used in any integer cycle or impulse type modulation and more particularly a method of modulation known by its commercial designation, xMax, but can be implemented on any broad band wireless technologies like WiMax, WiBro, WiFi, 3GPP and HSDPA, or any other type of wired or wireless voice or data systems. This disclosure describes an element-based method to automatically configure mobile handsets by the base station using a protocol that combines contention-free and contention-based MAC protocols for use in wireless VoIP systems with multiple base stations.

DESCRIPTION OF THE DRAWINGS

For a fuller understanding of the nature and objects of the invention, reference should be made to the accompanying drawings, in which.

DETAILED DESCRIPTION OF THE INVENTION

Although the element-based method to automatically configure mobile handsets by the base station disclosed herein can be used in all wireless and wired networks the preferred embodiment is described below in the context of the new wireless physical layer technology developed by xG Technology Inc., referred to as xMAX, which enables extremely low power omni-directional transmissions to be received in a wide area. Using xMAX, significant bandwidth can be made available for supporting various wireless applications. Voice Over IP (VOIP) based cellular services are now being developed using xMAX. In xMAX-based cellular networks both the base station and the handsets will be equipped with an xMAX transceiver. A mobile device (xMAX handset) in such a network will be free to move in an area covered by multiple xMAX base stations.

In the preferred embodiment VOIP-based cellular network xMAX handsets (or mobile nodes) are equipped with the complete VOIP stack. The xMAX base station is connected to the Internet through an Ethernet port. The mobile nodes communicate with the xMAX base station to reach a VOIP gateway. To enable communication between an xMAX handset and multiple xMAX base stations one needs a MAC (Medium Access Control) protocol that is optimized for VOIP traffic and has reduced overhead.

Figure 1:
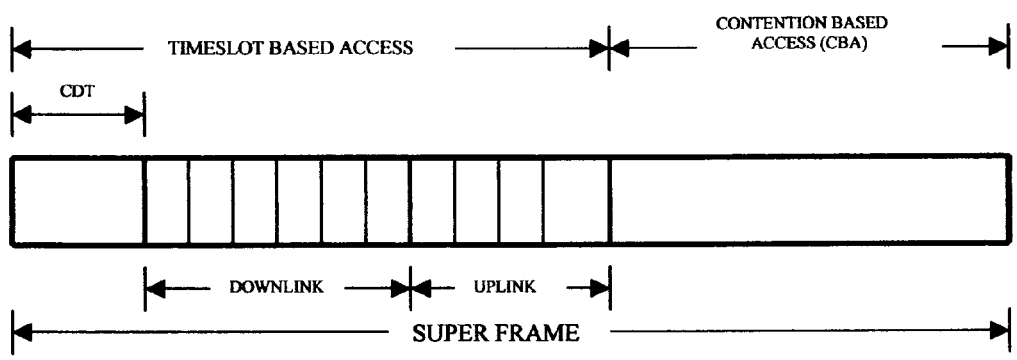
FIG. 1 is a diagram showing a super-frame.

In the MAC protocol of this invention the time domain is sliced into equal intervals of time. Each time interval is referred to as a super-frame as shown in FIG. 1. The initial part of the super-frame is reserved for Timeslot Based Access (TBA). The remaining part of the super-frame is meant for Contention Based Access (CBA). The TBA of each super-frame begins with Control Data Timeslots (CDT).

During CDT the base station transmits the control information. Timeslot assignment and registration acknowledgement are included in the control information. All the handsets are expected to be in the receive mode for the duration of the CDT in every super-frame.

Figure 2:
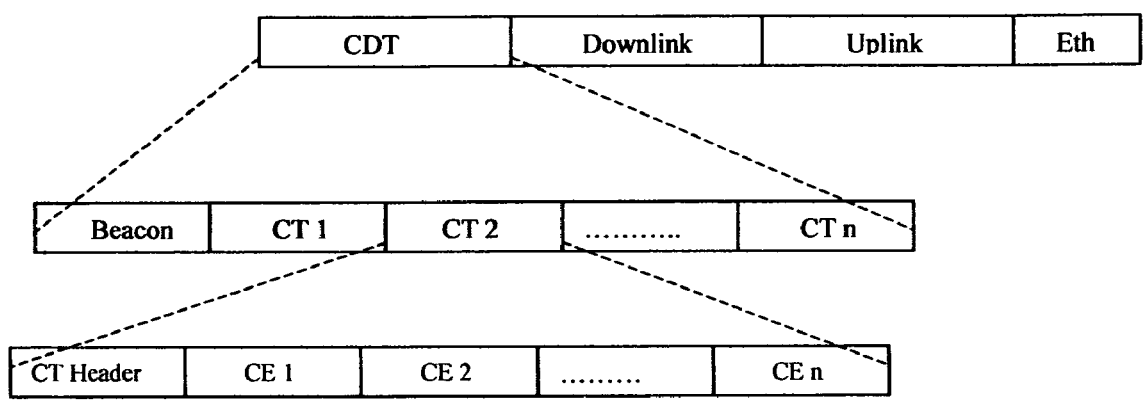
FIG. 2 is a diagram showing the CDT structure.

This invention disclosure describes a control element based approach the using of which we accomplish auto-configuration of handsets. The following method can also make the CDT more organized and flexible for future additions and changes. The concept of Beacons, Control Timeslot (CT) and Control Element (CE) is introduced. As shown in FIG. 2 each CDT will include:

Beacon: There will be exactly one Beacon frame in each CDT, regardless of any registrations and acknowledgements. The Beacon will contain all broadcast elements relevant to the super-frame.

Control Timeslots (CT): a CDT may contain 0 or more CTs. The number of CTs is dependent on the total number of registrations and timeslots assignments made in the super-frame. Each CT contains multiple Control Elements (CEs), where each CE will correspond to a specific type of control information that may be sent to the handset. This message may correspond to a particular handset, or it may be a broadcast message meant for all handsets.

A Beacon will be transmitted at the beginning of each super-frame and will allow the handsets to synchronize with the Base Station. It is comprised of information required by the handset to initialize its timeslot periods. It includes the following elements:
1) Base station ID (32 bits)
2) Super-frame Duration (16 bits)
3) Control slot Duration (16 bits)
4) Downlink Duration (16 bits)
5) Uplink Duration (16 bits)
6) Timeslot Duration (16 bits)
7) Guard band Duration (16 bits)
8) Super-frame Number (8 bits)
9) Number of Control Timeslots (8 bits)

In addition to the above 18 bytes of payload, the Beacon also includes 8 bytes of MAC header, 12 bytes of synchronization sequence, and 2 bytes of Beacon header. Thus a total of 40 bytes are transmitted. More parameters can be added leading to an increase in Beacon size. In the preferred embodiment of this invention the Beacon header is unused but can carry other values as can be easily recognized by those skilled in the art.

Each Beacon is followed by 0 or more CTs. Each CT will be comprised of multiple Registration (Network Join Acknowledgement) and Timeslot CEs. In the preferred embodiment the size of CT is fixed to 128 bytes. This is equivalent to the maximum number of bytes read into the buffer from the FPGA at the handset. The FPGA buffer size can be dynamically adjusted based on the size of incoming packet.

Each CT will consist of multiple CEs. Each Control Element will include:
Element Type: 8 bits in size, it will specify the type of control message. A total of 256 ($2^8$) Element Types can be defined.
Element Length: 8 bits. It specifies the size of CE in bytes, which can have a maximum value of 256 bytes.
Message specific information: Variable length. It will depend on Element Type.
The following are the types of elements:
Super-frame Info CE (Element Type 0x01): This CE contains all the global information relevant to the super-frame. In the preferred embodiment, all the data members of this CE constitute the Beacon fields.
Timeslot assignment/change (Element Type 0x02): This message provides information about the timeslot assigned to a particular mobile node. The length of this element will be 64 bits, of which 48 bits will be the MAC Address of the mobile node to which the assignment is made. The next 16 bits will specify the timeslot index, which corresponds to the position of Uplink and Downlink timeslots. Each CDT will include multiple timeslot assignment CEs, depending upon the number of assignments made.
Acknowledgement (Element Type 0x03): This message will be sent in response to a NetworkJoin message sent by the handset. The length of the CE will be 80 bits. It will include:
MAC address (48 bits): The MAC address of the handset that sent the registration request.
IP Address (32 bits): The IP Address assigned to the handset by the BTS on successful registration.
Note: The IP address is only assigned if Proxy DHCP is enabled. If DHCP is in use, then the handset will be expected to send a DHCP request. In such a case, an IP address of 0 can be sent, indicating normal DHCP. If the BTS is unable to register the handset, it will not send an acknowledgement.
IP Broadcast (Element Type 0xf1): This message is meant for all handsets and will include Gateway IP Address (32 bits), subnet mask (32 bits) and DNS Address (32 bits). It will only be transmitted on receiving a NetworkJoin message. All future broadcast messages will have element types starting from 0xf.

Each super-frame may contain a maximum of 16 registrations and 16 timeslot assignments. The size of a Registration CE is 12 bytes and the size of Timeslot CE is 10 bytes. Thus a total of (12*16+10*16=352) bytes can be accommodated and a maximum of 3 CTs may be transmitted in a CDT. However, as more CEs are defined, the number of CTs may increase.

This patent application discloses a systematic method for the base stations to update the handsets with control information. The proposed approach is structured and can be extended by defining new control elements as and when the need arises.

Since certain changes may be made in the above described element-based method to automatically configure mobile handsets by the base station using a MAC protocol for use in VoIP systems without departing from the scope of the invention herein involved, it is intended that all matter contained in the description thereof, or shown in the accompanying figures, shall be interpreted as illustrative and not in a limiting sense.

What is claimed is:

1. A system including a medium access control protocol that combines contention-free and contention-based medium access control protocols into a heterogeneous medium access control protocol used for forwarding Internet Protocol packets containing voice traffic, signaling traffic, and application data traffic between a base station and mobile nodes in a voice over internet protocol system on a wireless network comprising:
a base station in electrical communication with the Internet;
one or more mobile nodes in wireless electrical communication with said base station;
said base station and said one or more mobile nodes each having a medium access control protocol;
said medium access control protocol having super-frames of equal intervals of time;
each of said super-frames made up of an initial time for contention-free timeslot based access voice traffic and a remainder time for contention-based access signaling traffic and application data traffic;
said initial time for contention-free timeslot based access having control data timeslots, downlink timeslots, and uplink timeslots wherein the control data timeslots contain information regarding a current super-frame of said super-frames and said one or more mobile nodes are all capable of receiving said information during said control data timeslots in each of said super-frames; and,
wherein each of said control data timeslots contains a beacon, and one or more control timeslots wherein the number of said control timeslots dynamically changes for each super-frame in accordance with a number announced in each said beacon and each of said control timeslots contain control elements transmitted from said base station to said one or more mobile nodes to allow said one or more mobile nodes to automatically configure to a wireless network.

* * * * *